United States Patent
Akeyoshi et al.

[15] 3,694,897
[45] Oct. 3, 1972

[54] PROCESS FOR SOLDERING AN INORGANIC SOLID OXIDE PRODUCT

[72] Inventors: Kazuyuki Akeyoshi, Yamato; Naonori Hayashi, Tokyo, both of Japan

[73] Assignee: Asahi Glass Co., Ltd., Tokyo, Japan

[22] Filed: Sept. 23, 1970

[21] Appl. No.: 74,901

Related U.S. Application Data

[63] Continuation-in-part of Ser. No. 769,044, Oct. 21, 1968, Pat. No. 3,623,906.

[52] U.S. Cl. ............................................29/473.1
[51] Int. Cl. ..............................................B23k 31/02
[58] Field of Search .....117/DIG. 8, 123 B, 131, 211, 117/212; 29/473.1; 204/181

[56] References Cited

UNITED STATES PATENTS 2,139,469  12/1938  Sochse...................29/473.1 X
2,397,400  3/1946   Barwich......................113/112
2,426,650  9/1947   Sivian....................117/DIG. 8
2,522,082  9/1950   Arnold...................117/DIG. 8

FOREIGN PATENTS OR APPLICATIONS 153,445  11/1919  Great Britain.............29/473.1

OTHER PUBLICATIONS

Soldering Manual, prepared by American Welding Society, Copyright 1959, pp. 1,2,113– 114.

*Primary Examiner*—John F. Campbell
*Assistant Examiner*—Ronald J. Shore
*Attorney*—Oblon, Fisher & Spivak

[57] ABSTRACT

A soldering alloy which contains 40–98% by wt. of Pb; 1.8–50% by wt. of Sn; 0.05–10% by wt. of Zn; and 0.05–10% by wt. of Sb. A process for adhering said solder to a solid inorganic oxide product, such as glass or ceramic whereby ultrasonic vibration is applied.

4 Claims, No Drawings

APPARATUS FOR DRAWING THERMO-PLASTIC FILAMENTS IN A HIGH TEMPERATURE GAS VORTEX

This application is a continuation-in-part of copending U.S. application Ser. No. 769,044, filed Oct. 21, 1968, now U.S. Pat. No. 3,623,906.

BACKGROUND OF THE INVENTION

1. Field Of The Invention

This invention relates to a solder which is characterized by good adhesive properties to solid inorganic oxide products, such as glass or ceramic, and further to a process for applying said solder to a solid inorganic oxide product wherein the adhesive strength of the solder is greater than the tensile strength of either the solder alloy or the solid inorganic oxide product.

2. Description Of The Prior Art

It has heretofore been difficult to directly solder and obtain good adhesion by conventional solders to solid inorganic oxide products, such as glass or ceramic. It has therefore been necessary to indirectly solder such products by first preparing the product surface with a metal primer or the like prior to applying the solder. Such indirect soldering procedures, however, have proven to be very expensive and time consuming and usually result in the formation of an insufficient solder bond.

Another disadvantage of the prior art solders such for solid, inorganic oxide products has been that most such solders do not have good adhesive properties and their adhesive strength will decrease rapidly especially in the presence of moisture and air.

A need exists, therefore, for a solder which has good adhesive properties, which can be directly applied to a solid inorganic oxide product, and which is characterized by good aging properties, even upon exposure to water moisture and air.

SUMMARY OF THE INVENTION

Accordingly, it is an object of this invention to provide a process for directly applying a solder to a solid inorganic oxide product, wherein the adhesive strength of the solder bond is greater than the tensile strength of either the solder itself or that of the solid inorganic oxide product.

Another object of this invention is to provide a process for directly soldering a solid inorganic oxide product wherein the adhesive strength of the solder will be maintained even upon extensive aging.

A further object of this invention is to provide a process for soldering a solid, inorganic oxide product or a metal product to a solid, inorganic oxide base wherein a solder layer is applied to said inorganic oxide base and said oxide product or metal is adhered to said base by contacting and heating.

A still further object of this invention is to provide a solder composition which can be directly applied to a solid, inorganic oxide product.

These and other objects have now herein been obtained by adding Zn and Sb to a conventional Pb-Sn solder. It has been found that a good solder bond with solid, inorganic oxide products can be obtained by use of a solder alloy which is composed predominantly of Pb, Sn, Zn and Sb. It has further been found that the adhesive properties of the solder to a solid, inorganic oxide product can be enhanced by the use of vibration, such as ultrasonic vibration, during the soldering procedure.

DETAILED DESCRIPTION OF PREFERRED EMBODIMENTS

The alloy used in this invention, is predominantly composed of Pb, Sn, Zn and Sb and having the following composition, expressed in weight percent.

| | |
|---|---|
| Pb | 40 – 98% |
| Sn | 1.8 – 50% |
| Zn | 0.05 – 10% |
| Sb | 0.05 – 10% |
| Al | 0 – 0.1% |
| Si | 0 – 0.1% |
| Ti | 0 – 0.1% |
| Be | 0 – 0.1% |

The presence of aluminum, silicon, titanium and beryllium are optional metals which may be totally omitted if desired.

Preferably, the solder alloy of the present invention should have the following composition as expressed in weight percent:

| | |
|---|---|
| Pb | 81 – 93% |
| Sn | 3 – 9% |
| Zn | 1.5 – 6% |
| Sb | 0.5 – 4% |
| Al | 0 – 0.1% |
| Si | 0 – 0.1% |
| Ti | 0 – 0.1% |
| Be | 0 – 0.1% |

If the quantity of lead in the solder is less than 40% by wt. or the quantity of tin in the solder is more than 50% by wt., the solder layer forming the glass surface will tend to be too thin. Conversely, if the quantity of lead in the solder exceeds 98% by wt., or the quantity of tin is less than 1.8 percent, the strength of the bond between the solder and the glass or ceramic will be unsatisfactorily low and the soldering operation must be conducted at undesirably high temperatures. This can result in oxidative degradation of the solder, which in turn will adversely affect the working quality of the solder, and can also cause breakage of the glass or ceramic. If the solder contains less than 0.05% by wt. of zinc, the bonding strength of the solder will be quite poor, whereas if the solder contains an excess of 10% by wt. of zinc, the solder will be characterized by an inferior ductility and water resistance. If antimony is present in amounts of less than 0.5% by wt., the solder will be characterized by very poor resistance. Greater than 10% by wt. antimony, however, will result in reduced solder ductility.

Aluminum may be added to the alloy in amounts of less than 0.1% by wt. in order to prevent the formation of scale due to oxidation of the solder during the soldering operation. Good results are attainable if the aluminum is added in amounts of from 0.1 – 0.01 wt. % and preferably in amounts of from 0.05–0.02 wt. %. If the quantity of aluminum exceeds 0.1% by wt. the bond strength of the solder will be adversely affected. In addition, one or more members of the group consisting of silicon, titanium and beryllium may be incorporated into the solder in a combined amount of no more than 0.5 wt. %. These components can assist in the prevention of fogging or delustering of the solder surface. More specifically, these elements can be added in a combined amount of from 0.02–0.5 wt. % and can preferably be present in amounts of from 0.15–0.06 wt. %. If the total quantity of silicon, titanium and beryllium exceeds 0.5 wt. % the bond strength of the solder may be reduced.

Since silicon, titanium and beryllium are very high melting elements, it would be difficult to add these metals directly to the composition in their free metallic form. It is preferred, therefore, to introduce these metals to the solder composition in the form of mother alloys with copper or aluminum. Mother alloys include the alloys of: 76% Cu–25% Ti; 85% Cu–15% Si; and 96% Cu–4% Be. In this instance, about 1 to 3 percent copper will enter the solder composition. Although such small amounts of copper will not adversely affect the properties of the solder, the quantity of copper should not exceed 3 percent.

In the process for producing the solder alloy, the metal components are melted and mixed in a suitable crucible. Air, oxygen or an oxygen generating material is preferably injected into the melt in order to modify the viscosity and surface tension, without causing the formation of a slag. This tends to oxidize the alloy component which has been found to increase the adhesive strength of the ultimate solder. Using the solder composition of the invention, it is desirable to apply vibration, such as ultrasonic vibration. It has been found that vibration tends to activate the surface of the solid, inorganic oxide so that the oxide reacts with the solder.

In order to provide a suitable degree of vibration, especially ultrasonic vibration, a soldering spatula is preheated to about 200° to 400°C and is adapted to vibrate in a direction parallel to the surface of the inorganic, oxide product. Good results are obtainable when the spatula is caused to vibrate in the ultrasonic frequency of 20–30 kilocycles. During this operation, the soldering spatula will apply a frictional force to the surface of the oxide products, which tends to improve its surface activity. This technique provides a remarkably strong bond between the solder layer and the surface of the oxide product.

Another technique for soldering a metal product to an inorganic oxide surface is to first coat the surface of the metal product with the molten solder, either by using a soldering spatula or by dipping the metal product into a bath of the molten solder. The solder layer of the metal product is then placed in contact with the surface of the solid inorganic, oxide product and heat is supplied at the point of contact at a temperature of from 200°–400°C, which is sufficient to maintain the solder layer in a molten or semi-molten condition. The solder is then subjected to vibration by either vibrating the coated metal product or by vibrating the oxide product parallel to the soldering surface. Once good adhesion of the solder layer to the oxide surface is obtained, vibration is discontinued and the bond is permitted to cool. Vibration of the coated metal product or of the oxide product can be provided by the use of a vibrating generator which transfers the vibration through a transferring rod to the edge of either the coated metal product or the solid, inorganic oxide product. Where the metal product being applied is significantly smaller than the inorganic oxide product, it is preferable to attach the vibration transferring rod to the edge of the coated metal product.

The thickness of the solder applied can be controlled within a wide range. In coating the solder on the surface of the solid, inorganic oxide the thickness of the solder may be between 0.1–0.5 mm.

The tensile strength of the solder used in the invention will depend upon the particular ratio of the Pb:Sn. The variation of the tensile strength to Pb:Sn ratio is shown in the following table.

| Ratio of Pb:Sn in solder | Tensile strength |
| --- | --- |
| 4 : 6 | 482 kg/cm² |
| 5 : 5 | 458 " |
| 6 : 4 | 446 " |
| 6.5 : 3.5 | 430 " |
| 7 : 3 | 406 " |
| 8 : 2 | 400 " |
| 8.5 : 1.5 | 372 " |
| 9.5 : 0.5 | 263 " |

Where a glass product is being soldered to a metal product, it has been found that by using the technique of the present invention, the adhesive strength of the solder is higher than the tensile strength of the glass product. In one test for tensile strength, it was found that the glass product failed under a load of from 70–75 kg/cm² without failure of the solder bond between the glass surface and the solder layer. In other tests, wherein the high tensile strength ceramic product alumina was bonded to a metal product using the techniques of the present invention, the adhesive strength of the solder bond was found to be so high that although the solder itself failed at the tensile strength indicated in the above table, the soldered phase between the ceramic surface and the solder layer did not fail.

It is therefore a unique advantage of the present invention that solid, inorganic oxide products such as glass, ceramic or the like, can be bonded to a second solderable material with an adhesive strength which is greater than the tensile strength of either the solder itself or the tensile strength of the inorganic oxide product.

The soldering process of this invention can be used with a wide variety of products including inorganic solid oxide: such as inorganic oxide glass, for instance silicates or silica glass; glass ceramics; pottery or porcelain; sintered, fused or burned refractory oxides such as alumina, magnesia, spinel, thoria, berylia, zirconia; ceramics used for electronics or electric components such as barium titanate, ferrites, steatit, forstorit, titania; natural or synthetic crystals such as quartz crystals, ruby or sapphire; and cermets which are compounds of metal and oxide ceramics.

Having now generally described the invention, a more detailed understanding can be obtained by reference to certain specific examples which are provided herein for purposes of illustration only and are now intended to be limiting in any manner.

EXAMPLES 1–15

A series of ordinary soda lime silicate glass plates (100 mm. × 100 mm. × 3 mm.) were soldered to respective copper plates (50 mm. × 25 mm. × 3 mm.). The solder used in these examples consisted of the composition shown in the following table. In each soldering operation, a molten or semi-molten solder was coated onto a surface of the glass plate and was adhered hereto by applying ultrasonic vibration of 20 kc. to the surface with the tip of a solder spatula. The copper plate was placed onto the molten solder layer. Tensile strength test results are summarized in the table as follows: In measuring the adhesive property of the solder, the term "excellent" is used to designate the condition in which no stripping of the solder layer occurred, but in which failure of the glass plate itself occurred under a tensile strength of about 70 kg/cm$^2$; "fair" is used to designate the condition in which stripping of the solder layer occurred occasionally although in most instances, failure of the glass plate itself occurred before failure of the solder layer; "weak" is used to designate the condition in which stripping of the solder layer occurred frequently. In measuring water resistance, the term "excellent" is used to designate the condition in which no decrease of adhesive strength occurred after being placed in boiling water for 6 hours; "fair" is used to designate the condition in which a relatively moderately decrease in tensile strength occurred after being placed in boiling water for 6 hours; "weak" is intended to indicate the condition in which the adhesive strength was found to be substantially decreased after being placed in boiling water for 6 hours. In measuring ductility, the term "excellent" is intended to designate the condition in which the solder demonstrated suitable plasticity during a wire drawing operation; the term "fair" is intended to indicate the condition in which the plasticity of the solder was suitable for moderate wire drawing; and the term "weak" is intended to indicate the condition in which the plasticity was so poor that wire drawing was not feasible.

| | Composition Weight % | | | | Adhesiveness | water resistance | ductility |
|---|---|---|---|---|---|---|---|
| No. | Pb | Sn | Zn | Sb | | | |
| 1 | 81 | 9 | 6 | 4 | excellent | excellent | excellent |
| 2 | 93 | 1 | 2 | 1 | excellent | excellent | excellent |
| 3 | 95 | 3 | 1.5 | 0.5 | excellent | excellent | excellent |
| 4 | 40 | 50 | 5 | 5 | fair | excellent | excellent |
| 5 | 45 | 40 | 10 | 5 | fair | fair | fair |
| 6 | 79 | 6 | 5 | 10 | fair | excellent | fair |
| 7 | 98 | 1.8 | 0.05 | 0.05 | fair | fair | excellent |
| 8 | 30 | 62 | 5 | 3 | weak | excellent | excellent |
| 9 | 99 | 0.5 | 0.3 | 0.2 | weak | excellent | excellent |
| 10 | 88 | 1 | 6 | 5 | weak | excellent | fair |
| 11 | 35.8 | 60 | 3.0 | 1.2 | weak | excellent | excellent |
| 12 | 92 | 5 | 0.01 | 2.99 | weak | excellent | excellent |
| 13 | 81 | 2 | 15 | 2 | fair | weak | weak |
| 14 | 93 | 3.99 | 3 | 0.01 | excellent | weak | excellent |
| 15 | 70 | 13 | 2 | 15 | fair | excellent | weak |

EXAMPLE 16–22

22-Cr stainless steel plate (50 mm. × 25 mm. × 3 mm.) was soldered to a soda lime silicate glass plate (100 mm × 100 mm. × 3 mm). The adhesion area was 25 × 15 mm. The composition of the solder used in this example consisted of 66.40% by wt. Pb, 28.36% by wt. Sn, 2.84% by wt. Sn, 1.89% by wt. Sb, 0.04% by wt. al, 0.38% by wt. Cu, 0.04% by wt. Si and 0.05% by wt. Ti. The solder was melted at 240° C and coated onto the metal plate. The metal plate was attached to a vibration transferring rod from an ultrasonic vibration generator. The solder coated metal plate was then heated to 200°–240°C for 15 seconds and the glass plate was heated to a temperature of 190°–230°C for 5 seconds. The glass plate was then laid on top of the solder layer of the metal plate and ultrasonic vibration of 30 kilocycles was applied to the metal plate for 5 seconds. The metal plate-glass plate was then cooled to room temperature whereby it was found that the glass plate was adherently bound to the metal plate. In a tensile strength test, it was found that the glass plate failed at 70 kg/mc$^2$ without stripping the soldered phase between the glass and the solder layer.

EXAMPLE 17

A series of refractory plates (15 mm. × 15 mm. × 5 mm.) were soldered to a series of copper plates (15 mm. × 25 mm. × 3 mm.) in accordance with the process outlined in Example 1. The refractory oxide plates were composed respectively of sintered alumina (corundum), fused alumina (corundum), sintered magnesia (periclase), fused magnesia (periclase), sintered spinel (Al$_2$O$_3$·MgO) and quartz single crystal.

The composition of the solder used in this process consisted of 91.2 wt % Pb, 4.8 wt % Sn, 3.0 wt. % Zn and 1.0 wt. % Sb. The shear strength of each soldered product was measured. It was found that the solder layer failed at about 260 kg/cm$^2$ without stripping the soldered phase from the sintered alumina, fused alumina, sintered spinel or quartz single crystal plates. On the other hand, the ceramic plate failed at about 190 kg/cm$^2$ in the case of sintered magnesia and at about 160 kg/cm$^2$ in the case of fused magnesia without stripping the soldered phase.

Having now fully described the invention, it will be apparent to one of ordinary skill in the art that many changes and modifications can be made without departing from the spirit of scope thereof.

Accordingly, what is intended to be covered by letters patent is:

1. A process for bonding a solderable material to a glass or ceramic solid inorganic oxide product which comprises contacting said inorganic oxide product with a molten solder consisting essentially of 40 – 98 wt. % Pb; 1.8 – 50 wt. % Sn; 0.05 – 10 wt % Zn; 0.05 – 10 wt % Sb; 0 – 0.1 wt % al; 0 – 0.1 wt % Si; 0 –0.1 wt % Ti and 0–0.1 wt % Be while applying vibration to the point of contact of said inorganic oxide product and said solder to form a solder coated inorganic oxide product, contacting said solderable material to the solder layer of said solder coated inorganic oxide product and applying heat to the point of contact so as to form an adherent bond between said solderable material and said glass or ceramic.

2. The process of claim 1 wherein said solderable material is selected from the group consisting of glass, ceramic and metal.

3. A process for bonding a metal plate to a glass or ceramic solid inorganic oxide product which comprises coating a solder alloy consisting essentially of 40 – 98 wt.% of Pb; 1.8 –50 wt. % of Sn; 0.05–10 wt. % Zn; 0.5 – 10 wt.% Sb; 0 – 0.1 wt. % al, 0 – 0.1 wt. % Si; 0 – 0.1 wt.% Ti and 0 – 0.1 wt.% Be., onto a metal plate, contacting the solder layer of said solder coated metal plate with said glass or ceramic solid inorganic oxide product, heating the point of contact between said solder layer and said inorganic oxide product so as to melt said solder while applying vibration to said point of contact, solidifying said solder so as to form an adherent bond between said metal plate and said glass or ceramic.

4. The process of claim 3 wherein said solder is applied to glass.

5. The process of claim 3 wherein said solder is applied to ceramic.

* * * * *